Figure 1:
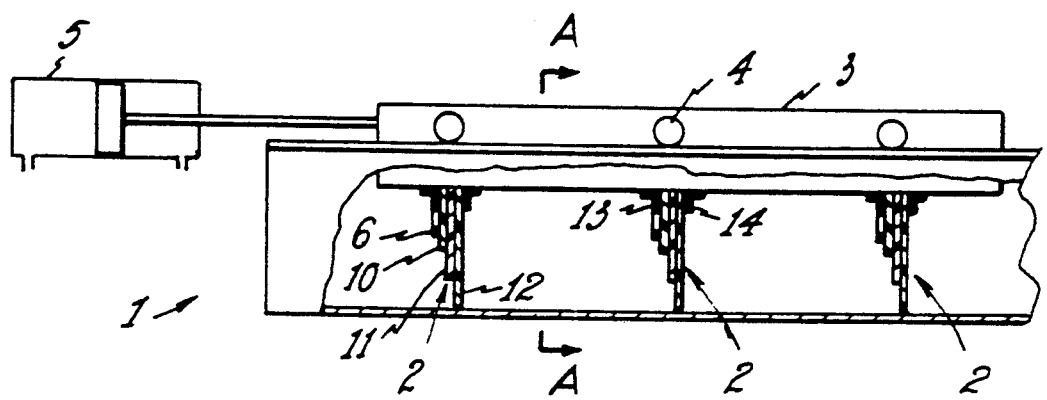

United States Patent
Rousseau

Patent Number: 5,261,524
Date of Patent: Nov. 16, 1993

[54] APPARATUS FOR CONVEYING LOOSE MATERIAL, WITH BACK-AND-FORTH MOTION

[75] Inventor: Jacques Rousseau, Morlanwelz, Belgium

[73] Assignee: Ettecom S.A., Morlanwelz, Belgium

[21] Appl. No.: 720,489

[22] PCT Filed: Jan. 31, 1990

[86] PCT No.: PCT/BE90/00006
§ 371 Date: Jul. 5, 1991
§ 102(e) Date: Jul. 5, 1991

[87] PCT Pub. No.: WO90/08718
PCT Pub. Date: Aug. 9, 1990

[30] Foreign Application Priority Data
Feb. 6, 1989 [BE] Belgium .............. 8900112

[51] Int. Cl.⁵ .............................. B65G 25/00
[52] U.S. Cl. ............................ 198/741; 198/747
[58] Field of Search .............. 198/736, 738, 741, 742, 198/743, 744, 746, 747, 468.11

[56] References Cited

U.S. PATENT DOCUMENTS

| | | | |
|---|---|---|---|
| 544,031 | 8/1895 | Draver | 198/743 |
| 2,751,061 | 6/1956 | Nickerson | 198/747 X |
| 2,920,753 | 1/1960 | Wenger | 198/743 |
| 3,024,765 | 3/1962 | Reed | 198/741 X |

FOREIGN PATENT DOCUMENTS

| | | | |
|---|---|---|---|
| 1185991 | 1/1965 | Fed. Rep. of Germany | 198/746 |
| 2579571 | 10/1986 | France | 198/741 |
| 0273411 | 12/1986 | Japan | 198/747 |
| 1404400 | 8/1975 | United Kingdom . | |

*Primary Examiner*—James R. Bidwell
*Attorney, Agent, or Firm*—Oblon, Spivak, McClelland, Maier & Neustadt

[57] ABSTRACT

An apparatus for conveying loose material includes a chute with static bottom shaped like a trough, adapted to accommodate the material to convey, and a series of conveyance members mounted to move back and forth on a movable frame. Each conveyance member includes at least two juxtaposed blades, extending up to a different depth inside the chute, and in that the depth up to which the superimposed blades extend inside the chute decreases from the front blade (facing the conveyance direction of the material) to the rear blade (opposite the conveyance direction of the material).

8 Claims, 2 Drawing Sheets

APPARATUS FOR CONVEYING LOOSE MATERIAL, WITH BACK-AND-FORTH MOTION

The invention relates to an apparatus for conveying loose material, with back-and-forth motion, of the kind that is suited for instance to convey scrap, pulverulent or grained material or also pasty material, along a conveyor chute.

Such apparatuses are known to the art

Thus, the French Published patent specification 2 077 973 discloses a conveyor for loose material which includes a chute with a static bottom shaped like a trough, which accommodates the material to convey, and a series of shutters driven simultaneously in a back-and-forth motion along the length of the chute, that motion including a rectilinear movement of translation for advancing the material, imposed by a stop that is also driven, against which the shutter comes to lean, the end of the shutter being then contiguous with the bottom of the chute, without touching it, and a movement of translation in the opposite direction, combined with a free pivoting of the shutter moving apart the stop under the effect of its rubbing against the material, in which each shutter has a generally concave profile, with a concavity turned in the direction of the advance of the material, that concave profile displaying however a flat part that is adapted to cooperate with the associated flat stop.

On the other hand, the French Published patent specification 25 79571 discloses an apparatus for conveying granular or pasty materials, which includes a chute with a static bottom shaped like a trough, which accommodates the material to convey, and a series of pulser elements supported by a movable frame driven by a motive element, in which the pulser-elements stem from the combination of a flexible blade and a rigid comb so that, during the return motion, the rigid comb moves inside the material without driving it, while the flexible blade changes shape and slides on the material, and during the forward motion of the flexible blade, cooperates with the rigid comb, thus making it possible to obtain enough rigidity in the pulser element to ensure the movement of the material.

Those two kinds of conveyance devices display an inconvenience in that, if too much material is brought at once inside the conveyance chute, it can become clogged, the conveyance members (above shutters or pulsers) then ceasing to be efficient until there is external intervention.

This clogging takes place in practice when the height of the material inside the conveyance chute becomes too great in relation to the height of the conveyance members. Indeed, the position adopted by those members, during a return run, is then such (free end portion forming an angle that is too small in relation to the direction of the movement) that those members simply slide, in both directions, and in the clearance position, on the upper surface of the material inside the chute, since the penetration force inside the material, which is a function of said angle, is not adequate.

One purpose of the invention is to solve at least in substance this clogging problem.

According to the invention, this goal is reached with an apparatus for conveying loose material, which includes a chute with a static bottom shaped like a trough, to accommodate the material to convey, and a series of conveyance members, supported in the chute by a frame movable back-and-forth, by providing for that each conveyance member is made of a blade fastened at its upper end to the movable frame and which, under the sole action of forces to which it is subjected during its movement, tends to move in an initial active position, buried inside the material, leaning on a support member, during the active run of the back-and-forth motion of the movable frame, and in a clearance position in relation to the material during the return run of the back-and-forth motion of said frame, wherein each conveyance member includes at least two juxtaposed blades said blades having lengths such that they extend to different depth inside the chute, and the depth up to which the superimposed blades extend inside the chuts decrease from the leading blade, facing the conveyance direction of the material, to the rear blade, opposite the conveyance direction of the material.

According to another characteristic of the invention the blades are rigid blades which are mounted to pivot on the movable frame, at their upper edge, and the support member is a stop.

According to yet another characteristic of the invention, the blades are flexible blades mounted to be static on the movable frame, at their upper edge.

According to yet another characteristic of the invention, the flexible blades possess together enough rigidity to convey the material, during the active run of the conveyance members, whithout external support other than a support for the first active rear blade.

According to yet another characteristic of the invention, the support is a stop for the shortest rear blade.

According to yet another characteristic of the invention, the support is comprised of a first inactive rear blade, which is not used for the conveyance of the material.

According to yet another characteristic of the invention, the support is comprised of the front member for fastening the blades to the movable frame.

According to yet another characteristic of the invention, the blades possess increasing rigidity, from the shortest active blade to the longest blade.

Figure 2:
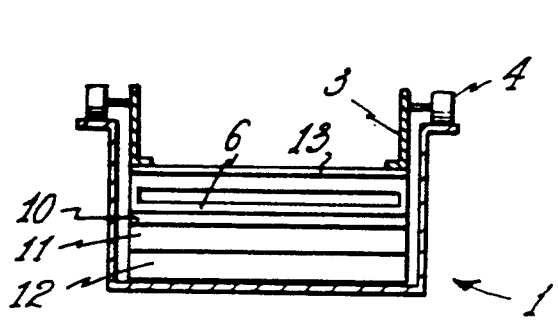
Figure 3:
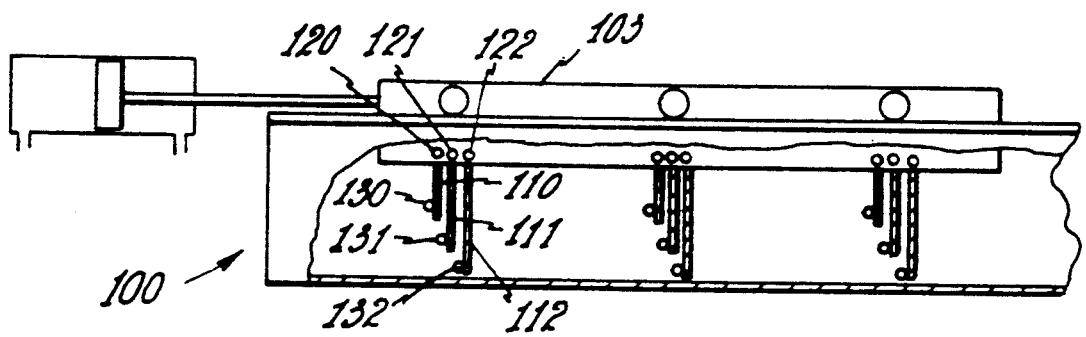

Other aspects, characteristics and advantages of the invention will appear from the description that follows, and the attached drawings wherein FIG. 1 is a partially exploded schematic lateral view of a conveyance apparatus which sets forth an embodiment of the invention, that includes conveyance members or pulser members with flexible blades, FIG. 2 is a sectional view along line A—A in FIG. 1, FIG. 3 is a view analogous to FIG. 1, of an apparatus that sets forth another embodiment of the invention, which includes conveyance members with rigid blades or shutters.

Figure 4:
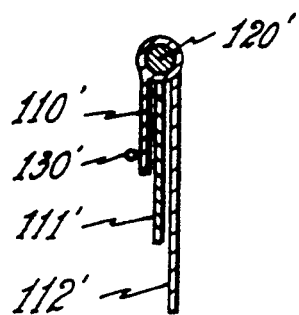
Figure 5:
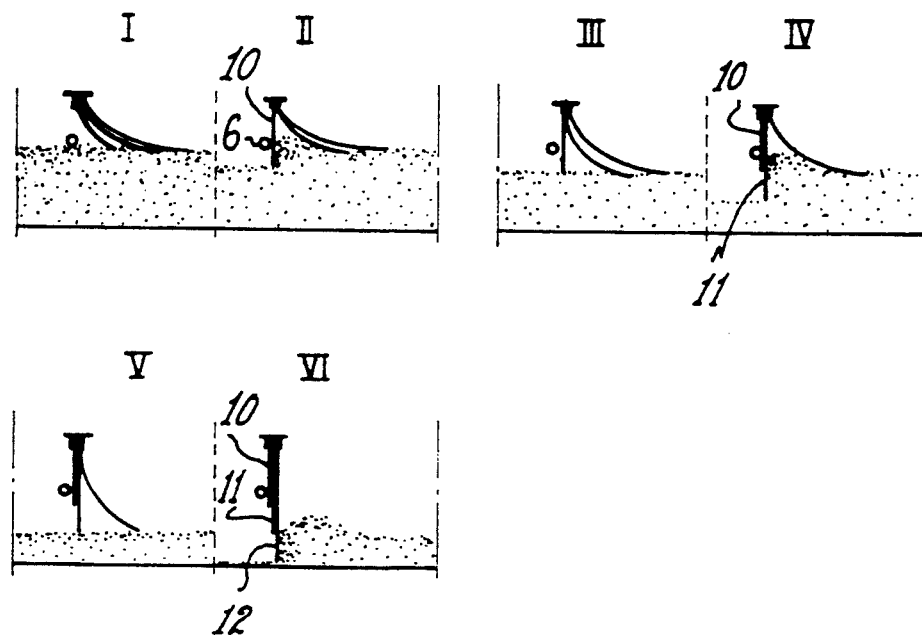
Figure 6:
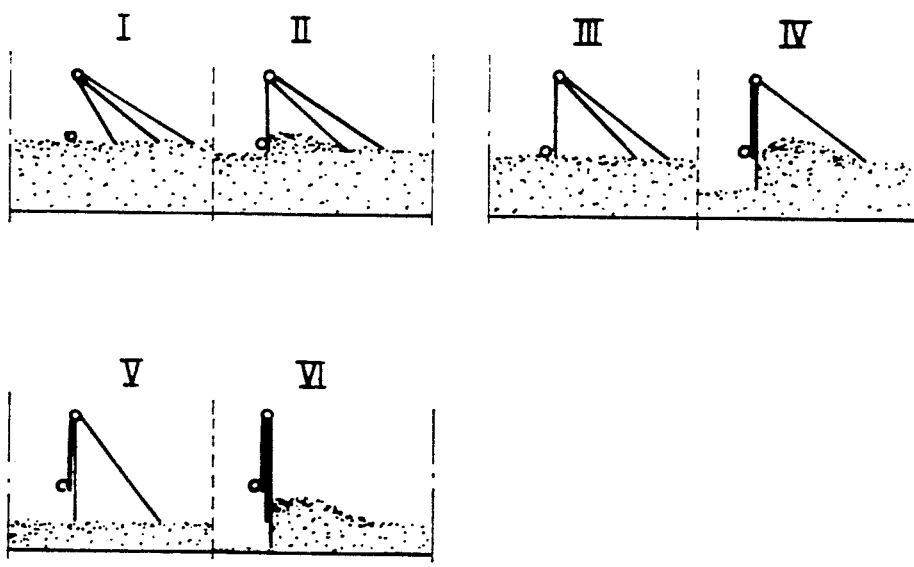

FIG. 4 depicts a variant of a conveyance member with rigid blades according to the embodiment of FIG. 3, FIG. 5 is an elevated, lenghtwise sectional diagram, of the operating mode of a conveyance apparatus according to FIG. 1, with flexible blades, the various positions (I) to (VI) depicting different stages during a conveyance process, with unclogging, and FIG. 6 is a diagram similar to that in FIG. 5, for the embodiment with rigid blades according to FIG. 4.

With regard to FIG. 1, the conveyance apparatus includes a chute 1 shaped like a trough, inside which conveyance members 2 move back-and-forth, mounted on a movable frame 3 rolling on rollers 4, on the chute 1. The back-and-forth control of the frame 3 has been depicted schematically in FIG. 1 by a dual action mechanism 5.

The conveyance members 2 are identical, and only one such member will be described hereafter.

As it can be seen from FIG. 1, a conveyance member 2 includes three superimposed blades 10, 11, 12, firmly maintained by their upper edge between shaped bars 13, 14 fastened to the frame 3.

Under the action of the mechanism 5, the frame 3 adopts, while operating, a back-and-forth motion which includes an active run and a return run, the active run corresponding to the movement to the right, and the return run to the movement to the left in the plane of FIG. 1.

The conveyance member 2 includes three flexible superimposed blades, 10, 11, 12, of which the upper edges, fastened to the frame 3, substantially coincide. As it appears from the drawing, and this is a characteristic of the invention, these blades all have a different height, gradually decreasing from the leading side towards the rear side (in relation to the direction of the movement in the active run), and the height of the leading blade 12 corresponds to the depth of the chute, in the same way as the height of the sole blade of the known apparatuses.

There is a dual purpose for the additional blades 10 and 11.

First, they are used to suppress cloggings, as will be explained in greater detail later in connection with FIG. 5.

Under normal operating conditions, by that we mean the operating periods without clogging, the front blade 12 ensures on its own substantially the entire conveyance task, in the same way as the sole blade of the known apparatus, since it covers nearly the entire section of the chute, and it leaves little or no material behind it.

During those periods when it plays practically no active role in conveying the material, each additional blade 10, 11 ensures its second function, which is to support the blade that is immediately adjacent to it in the movement direction during the active run. Thus, the blade 10 acts as a support for the blade 11, the latter acting as a support for the blade 12 which ensures the actual conveyance of the material during the active run to the right of FIG. 1.

In the embodiment depicted in the drawing, the shortest blade 10, acting as a support for the others during an active run, is itself supported on a stop 6 fastened to the frame 3. Since the blade 10 is flexible, the stop 6 will preferably extend on its entire width, at a sufficient distance from its lower edge to avoid it going to the other side.

When the elasticity of the blades is conveniently designed, that apparatus of the invention makes it possible to obtain as a result enough flexibility in the individual blades, so that they retract easily by bending, without driving the material, during the return run (to the left in FIG. 1), and they react together, during the active run, as a single blade which is rigid enough and leans on a stop like a rigid shutter.

The number of those blades will depend, in a specific application, for instance on the depth of the chute and the density or the viscosity (in the case of pasty material) of the material.

In any event, if the strength of a set of blades proves to be inadequate, one can provide on the back of the conveyance member a support member, which is also fastened to the movable frame, such as one or more horizontal rods, or even a trellis or any other support member which displays an open surface sufficient to allow the material to go through, during the return run, by driving as small a quantity thereof as possible, and ensuring also the desired support to the blades.

The operating mode of this embodiment of the invention will now be explained in greater detail in connection with FIG. 5, where there is shown a condition of clogging in the chute.

References I to VI on this figure point to various positions during the operation of the apparatus, namely the extreme position substantially at the end of a return run for positions I, III and V, and an intermediate position during an active run for positions II, IV and VI.

In state I, at the end of the return run, the three blades are depicted as bended, with their free end part resting on the upper surface of the material inside the chute.

In position II, during the first active run after the clogging takes place, the shortest blade 10, of which the free end part forms the smallest attack angle in relation to the surface of the material, and therefore displays the greatest penetration force inside the material, has penetrated inside the material and is conveying the upper part of the amount of material found in the chute, by leaning on the stop 6.

In position III, the situation is the same as with position I, with the one major difference that the height of the material inside the chute is less, since it was reduced by the amount conveyed by the blade 10.

The situation in position IV is analogous to that depicted for position II, but in that the blade 11 now ensures conveyance, while being supported by the blade 10.

The material height is still reduced at position V, and the blade 12 is active in position VI, while being supported by the blades 10 and 11.

The above concerns a description of the operation that is of course quite diagrammatic, where things can take place more or less rapidly, for instance according to the more or less uniform height of the material inside the chute, the irregularities (owing to their ascending slope in the direction of the active run), as well as a greater thickness of the granules, for example, leading to favor the penetration of blades inside the material.

By referring now to the embodiment of FIG. 3, it differs from the embodiment of FIG. 1 in that the blades of the conveyance members are rigid blades here, mounted to pivot, by their upper edge, on the movable frame 103.

In FIG. 3, the rigid blades 110, 111, 112 are mounted on separate, parallel, pivoting axes, 120, 121, 122. In the variant of FIG. 4, the blades 110', 111', 112' are mounted to pivot on a same axis 120'.

For pivoting rigid blades, there has been provided, in a known fashion, stops 130, 131, 132, respectively 130', so as to prevent the blades from pivoting to the rear, beyond their active position which is substantially perpendicular to the direction of movement, during the active run.

However it is not necessary to provide three stops as in FIG. 3. Indeed, one can provide one single stop (like the stop 130' for the blade 110', FIG. 4), the other blades leaning on it. In this case it could be judicious to offset the single stop enough to the right, in the plane of the figure, so that, in the supported active position, the side of the leading blade forms an obtuse angle with the bottom of the chute, and its action therefore tends to push the material upwards, by avoiding a squeezing effect at the blade-bottom junction.

The relative inconvenience of the variant in FIG. 4 is that the link of each blade with the pivoting axis can only extend on one third of the width of the frame 103, while the relative inconvenience of the embodiment of FIG. 3 is that it is more complex, and therefore more expensive.

FIG. 6 is analogous to FIG. 5, but for rigid blades, mounted on a single pivoting axis according to the variant of FIG. 4.

Even though that aspect of the invention is less significant in the event of rigid blades, that need only to be sufficiently firm, one can also take into account, when designing their strength, the support action that the rear blades ensure for the front blades.

The previous description, and the attached drawings, have been limited to an embodiment with three blades.

This is obviously only one example of the implementation of the invention, which will include generally a number of blades ranging from at least two to some number "N" adapted to the particularly envisioned application, especially in view of the nature of the blades and the nature of the material to convey.

Also it has been considered in the above that the blades were made of the same substance, and possessed the same thickness.

It can however be advantageous, at least for some applications with flexible blades, to assign greater rigidity to the longest blades, in order to increase the elastic recall force that tends to restore them to a straight, not bended position.

This greater rigidity can be obtained both by a change of material (for instance a change in kind or in density) as well as by an increase in thickness.

Finally, in the embodiment of FIGS. 1 and 2 the stop 6 has been provided as a distinct organ of the apparatus, but one must understand that this depiction of the stop has been used for the sake of simplification.

Indeed, the support of the flexible blades during the active run can also be obtained, for instance, with a first rear blade (blade 10 in the embodiment of FIG. 1) rigid enough to ensure that function (this blade no longer acting in fact for conveyance), or still by allowing the rear blade fastening member (shaped bar 13) to ensure that support function.

Other variants, which fall within the framework of the invention, will become evident for the man of art, upon reading this description.

I claim:

1. An apparatus for conveying loose material, which includes a chute with a static bottom shaped like a trough in order to accommodate the material to be conveyed and a series of conveyance members supported in the chute by a frame movable back-and-forth, wherein each conveyance member comprises a blade fastened by its upper part to the movable frame and which, with the sole intervention of forces to which it is subjected during its movement, tends to move into a first active position, buried inside the material, leaning on a support member, during the active run of the back-and-forth motion of the movable frame, and in a clearance position in relation to the material during the return run of the back-and-forth motion of said frame, characterized in that each conveyance member (2; 100) includes at least two juxtaposed blades (10, 11, 12, 110, 111, 112; 110', 111', 112') in that said blades have lengths such that they extend up to different depths inside the chute, and in that the depths up to which the superimposed blades extend inside the chute decrease from the front blade, facing the conveyance direction of the material (12; 112; 112'), to the rear blade, opposite the conveyance direction of the material (10; 110; 110').

2. An apparatus according to claim 1, characterized in that the blades are rigid blades (110, 111, 112; 110', 111', 112'), mounted to pivot on the movable frame, at their upper edge, and in that the support member is a stop (130, 131, 132, 130').

3. An apparatus according to claim 1, characterized in that the blades are flexible blades (10, 11, 12), fixedly mounted on the movable frame, at their upper edge.

4. An apparatus according to claim 1 characterized in that the flexible blades possess together a rigidity adequate to convey the material, during the active run of the conveyance members (2), without external support other than support for the first active rear blade.

5. An apparatus according to claim 4, characterized in that the support is a stop (6) for the shortest rear blade (10).

6. An apparatus according to claim 4, characterized in that the support comprises a first inactive rear blade, which is not used for conveyance of the material.

7. An apparatus according to claim 4, characterized in that the support is comprised of the rear member for fastening the blades to the movable frame.

8. An apparatus according to anyone of claims 3 through 7, characterized in that the blades possess increasing rigidity from the shortest active blade to the longest blade.

* * * * *